United States Patent [19]

Roldan et al.

[11] Patent Number: 5,009,592
[45] Date of Patent: Apr. 23, 1991

[54] HOT AIR GENERATING DEVICE WITH A CATALYTIC BURNER

[75] Inventors: Antoine Roldan, Mions; Daniel Demilliere-Vergnais, Francheville, both of France

[73] Assignee: Application Des Gaz, Paris, France

[21] Appl. No.: 427,496

[22] Filed: Oct. 27, 1989

[30] Foreign Application Priority Data

Oct. 28, 1988 [FR] France .................. 88 15370

[51] Int. Cl.[5] ............................................. F24H 1/00
[52] U.S. Cl. ................... 432/222; 432/219; 431/255; 431/344
[58] Field of Search .............. 432/222, 223, 219; 431/255, 344

[56] References Cited

U.S. PATENT DOCUMENTS

| | | | |
|---|---|---|---|
| 3,301,308 | 1/1967 | Briggs | 432/222 |
| 3,306,335 | 2/1967 | Myers | 432/222 |
| 3,995,991 | 12/1976 | Wilkinson | . |
| 4,555,232 | 11/1985 | Raccah et al. | 432/222 |
| 4,573,912 | 3/1986 | Albritton et al. | 126/110 C |
| 4,635,382 | 1/1987 | Bourdeau | . |
| 4,726,767 | 2/1988 | Nakajima | 432/222 |

FOREIGN PATENT DOCUMENTS

| | | |
|---|---|---|
| 3103843 | 9/1982 | Fed. Rep. of Germany . |
| 3614059 | 8/1987 | Fed. Rep. of Germany . |
| 44-717 | 1/1969 | Japan . |
| 45-28331 | 10/1970 | Japan . |
| 2167546 | 5/1986 | United Kingdom . |
| 2170705A | 8/1986 | United Kingdom . |

Primary Examiner—Henry C. Yuen
Attorney, Agent, or Firm—Oliff & Berridge

[57] ABSTRACT

The present invention relates to a hot air-generating device, combining a catalytic gas burner and a fan. According to the invention, on the one hand, the catalytic burner is of the induced-air type, for which means for mixing primary air in with the pressurized fuel gas are arranged upstream of the burner and, on the other hand, these same means comprise a component for drawing off oxidant air, independently of the circulation conduit which draws off primary air outside the latter. The invention can be applied to any kind of hot air-generating device, such as a hair drier and a hot-air gun for stripping paint.

10 Claims, 3 Drawing Sheets

HOT AIR GENERATING DEVICE WITH A CATALYTIC BURNER

The present invention relates to a hot air-generating device which combines a gas burner of the catalytic type and ventilation means. A device of this type may be applied in different technical fields, for example as a portable hair drier or as a hot-air gun for stripping paint.

A device of the abovementioned type is described in the document DE-A-3,614,059, which comprises:

an elongated body which forms a conduit for the circulation of an air flow and extends from an inlet for fresh air to an outlet for hot air a ventilation means which comprises an electric motor and a fan arranged inside the body to generate the flow of air from the inlet to the outlet of the conduit a catalytic gas burner, which is arranged entirely inside the circulation conduit and is connected, on the one hand, to a source of fuel gas, in this case a rechargeable container arranged in the handle of the device, and on the other hand, to the outlet of the channel to mix here the combustion fumes with the air flow, and thus to produce the hot air which is discharged.

The so-called induced-air catalytic burner itself comprises:

a means for mixing in primary air and fuel gas, which is arranged entirely inside the conduit for the circulation of the air flow; and this means combines, on the one hand, an injector for ejecting a jet of pressurized fuel gas, and on the other hand, a component for drawing off primary air from the ventilated air flow, which is formed from a mixing tube, arranged in the extension of the injector and comprising at least one lateral perforation, and from an outer collar at the level of the said perforation for deflecting and introducing some of the ventilated air into the mixing tube a chamber for distributing the fuel gas mixed with air, downstream of the mixing means a catalytic structure, which consists of a refractory core run through from its inlet face to its outlet face by a plurality of parallel channels whose internal surface is coated with a combustion catalyst; the inlet face is in contact with the distribution chamber and the outlet face with the conduit for the ventilated air flow.

A device of the type described above operates as follows:

after the fuel gas circuit has been opened, a momentary naked ignition flame is lit between the distribution chamber and the inlet face of the catalytic structure; this flame gradually heats the refractory core since the ventilation means is dependent on the temperature of the catalytic burner, by an appropriate temperature sensor, the fan automatically starts up as soon as the catalytic structure reaches a predetermined temperature; thereafter, primary air is introduced into the burner, by forced convection, by means of the outer deflecting collar, which causes the momentary ignition flame to be extinguished the fuel gas/primary air mixture then passes through the catalytic structure, having reached its catalytic combustion working temperature, and the combustion consequently takes place catalytically, and the combustion vapors mix at the outlet of the burner with forced fresh air in order to produce the hot air which is discharged via the outlet of the conduit.

According to the above description, the operation of the catalytic burner according to DE-A-3,614,059 is totally dependent on the flow of forced air; this dependence, moreover, forms part of the catalytic combustion solution retained in this document since, on the one hand, the forced air serves to extinguish the momentary naked ignition flame of the catalytic burner and, on the other hand, for low thermal powers it is even envisaged to pass all the forced or ventilated air through the burner.

It must, moreover, be noted that this dependence of the catalytic burner on the ventilated air is the solution which springs immediately to the mind of a person skilled in the art in that induced-air catalytic burners are known for their high sensitivity to oxygenation of the mixture to be burnt, and that consequently the use for this purpose of ventilated air appears a priori to be very advantageous.

According to the invention, and contrary to the teaching of DE-A-3,614,059, it has been found that a dependence of this type gives many more serious disadvantages than advantages.

Firstly, the dependence of the catalytic combustion speed on the flow of ventilated air may cause the mixture to fall below stoichiometry, in other words to be enriched with fuel gas, in particular in the following circumstances:

the device is moved too close to a surface to be treated, and the flow rate of the flow of forced air is then temporarily reduced, sometimes to a considerable extent when the discharge of the power supply accumulators of the electric motor for driving the fan is completed, the flow of forced air becomes too small relative to the desired stoichiometry.

In these circumstances, the catalytic combustion is not longer sufficient to burn all of the fuel gas. Since the refractory ceramic is still sufficiently hot or glowing, a naked flame may ignite on the outlet face of the catalytic burner, opposite the outlet of the circulation conduit. Such a flame, even if only limited, may be unacceptable in terms of the safe use of the device.

Lastly, every forced hot-air device generally has several different operating speeds, for example one with a low flow rate and another with a high flow rate, selected by the user. It is evident that such a change in speed is incompatible with operation at a relatively constant power of the catalytic burner, except by modulating this power in accordance with the speed selected by the user, for example by more or less complicated control means which correspond to the flow rate of fuel gas.

The object of the present invention is to overcome the disadvantages described above.

To be more precise, the subject of the present invention is a technical solution allowing the aeration of the induced-air catalytic burner to be regulated and controlled.

According to the present invention, counter to the technical approach shown in the document DE-A-3,614,059, which is, moreover, as mentioned above, the most manifest to a person skilled in the art, it has been found that this control of the catalytic speed of combustion could be achieved by arranging the component for drawing off primary air so as to draw off the latter outside the conduit for the circulation of ventilated air, independently and separately relative to the flow of circulating air in the said conduit.

In addition to overcoming the abovementioned disadvantages, the solution according to the invention allows the catalytic burner to operate independently of the fan. Such an independence gives, in particular, the following decisive advantages.

The catalytic burner may have a design and size which depends solely on the caloric power to be produced. When operating, the nominal power will be achieved no matter what the circumstances in which, or speeds at which, the device is used.

The catalytic burner may have a design and size independent of the remainder of the device and according to its own constraints. In particular, the burner may have a size which allows a slightly excess aeration, so as to lower the operating temperature of the burner, which, in addition to questions as to safety of use, favors the resistance of the catalytic structure to aging.

In correspondence with this excess aeration, the flow rate of primary air independent of the ventilated air may be adjusted as a function of the temperature of the burner, for example to a low value, even zero, when the burner is started up, and then to a substantial operating value, by mechanisms which are known per se, referred to as "starter", and consist, for example, of a sealing bimetal strip.

Such excess oxygenation with a starter could not be envisaged from DE-A-3,614,059.

The ignition of the catalytic burner constitutes an autonomous process which cannot be interrupted in any way by the flow of ventilated air.

Various prior documents, and in particular U.S. Pat. No. 3,995,991 for a portable hot-air generator, and JP-C-69/717 for a hair drier, have proposed arranging a naked-flame gas burner essentially outside the conduit for the circulation of the flow of ventilated air. The choice of such an arrangement does not imply the recognition or identification of the independence of the primary air relative to the ventilated air as a factor which determines the satisfactory combustion required for the production of hot air. As the burner is located essentially outside the conduit for ventilated air, there is no special arrangement of the means for mixing in primary air and/or of the component for drawing off the primary air. Lastly, a naked-flame burner is something quite different to a catalytic combustion burner, especially an induced-air one, so that the means provided for one cannot be extrapolated to the other, and vice versa, in particular if the catalytic burner is essentially contained by the conduit for circulation of ventilated air, as is the case in the present invention.

The present invention will now be described by reference to the attached drawings, in which.

Figure 1:
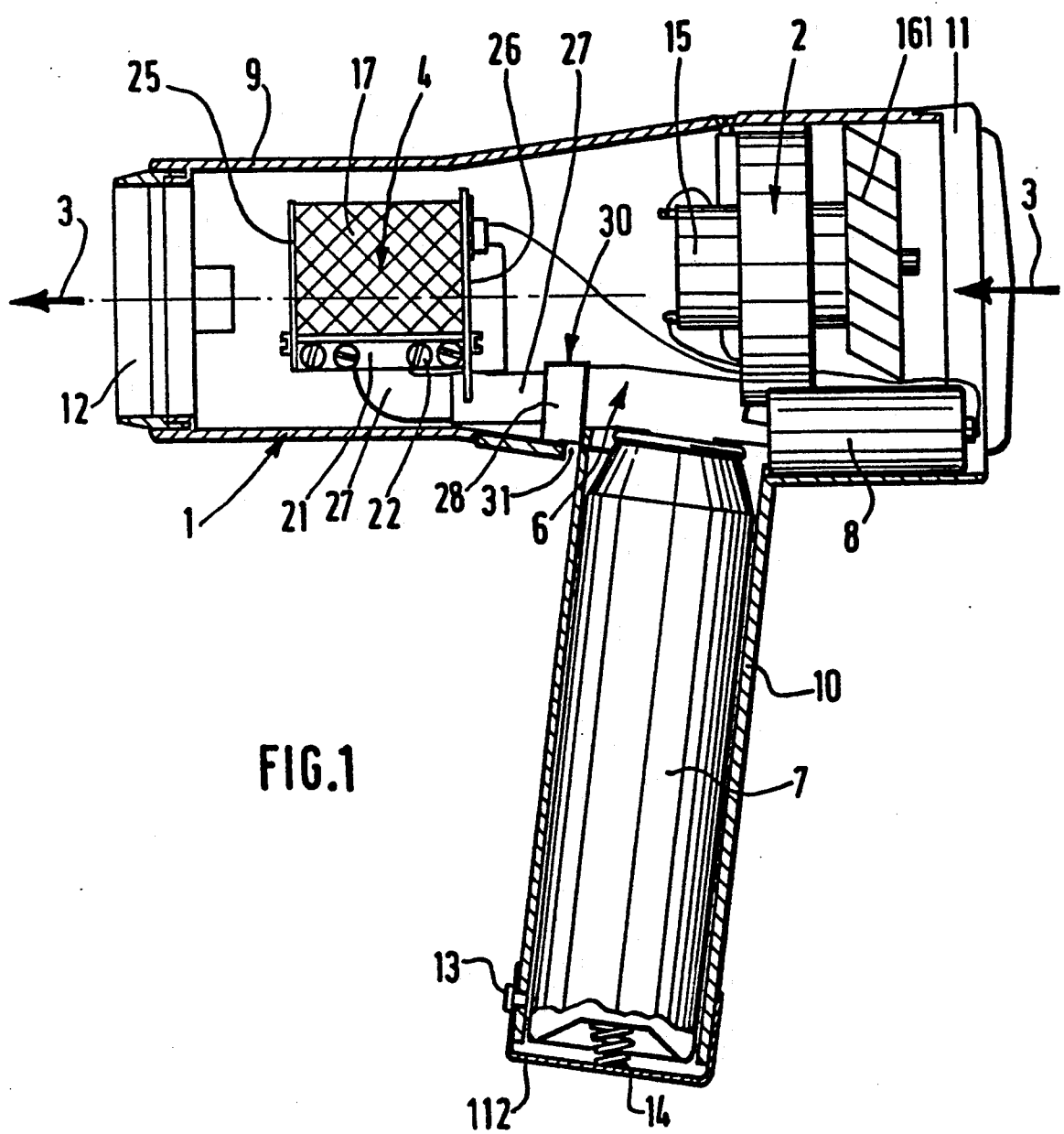
FIG. 1 shows a sectional diagrammatic view of a hot air-generating device according to the present invention.

The present invention is described by reference to a hair drier, of the portable type, and consequently for use at home, but it should be understood that this description does not mar the general nature of the present invention since, in particular, the same technical principles may be retained in other applications, for example for a hot-air gun intended for stripping paint.

The device according to FIGS. 1 to 4 has:
a body (1) which forms the outer casing of the device and has generally the shape of a gun;
ventilation means (2) which are arranged inside the body (1) and allow a flow of air to be generated which circulates in the device in accordance with the arrows designated with the reference number (3);
a gas burner (4), of the catalytic type, which is arranged inside the body (1) and the combustion vapors of which mix with the fresh air introduced by the ventilation means to produce the hot air which is discharged from the device;
a metal block (6), which is mounted inside the body (1) and ensures the passage of the pressurized fuel gas from an interchangeable cartridge (7) toward the burner (4);
a source (8) of electrical power supply, for example a simple battery or a rechargeable accumulator, which is arranged inside the body (1) and ensures the electrical power supply of the different components of the device which require such an energy source.

The autonomy of a device according to the invention, and in particular its independence relative to any electrical connection, consequently results from the incorporation, on the one hand, of the cartridge of fuel gas and, on the other hand, of the electrical source (8).

The body (1), which is made, for example, out of plastic, has two parts arranged substantially at right angles, namely a first part (9) which forms the conduit for the circulation of the air flow, from the rear to the front of the device, the rear part of the said conduit having a cross-section which is larger than that of the front part, and a second part (10), in the shape of a tube, which serves both to accommodate the cartridge of fuel gas (7) and for the user to grip the device by hand. A protective grid (11) is arranged at the rear of the conduit (9), while a blower (12) is arranged at the front of the same channel.

The lower part of the tube (10) is combined with a cap (112) which can be reversibly integrated by means of a bayonet mechanism (13). This cap (112) has a spring (14) allowing the cartridge (7) to be pressed against the metal block (6). The cartridge (7) is interchangeable, in other words it can be replaced by a full cartridge when it becomes empty, and contains a pressurized fuel gas, for example butane; it may, for example, be an aerosol type cartridge, such as described in the French Patent FR-A-2,580,376 filed by the Applicant.

The metal block (6), fastened inside the conduit (9) by appropriate means, comprises, on the one hand, means, not shown, for reversible connection to the cartridge (7), which allows at the same time a sealing joint with the aerosol valve and its opening, and, on the other hand, control means, not shown, which allow the circulation of fuel gas towards the catalytic burner (4) to be opened or closed, and/or the flow rate sent towards the latter to be adjusted.

Figure 4:
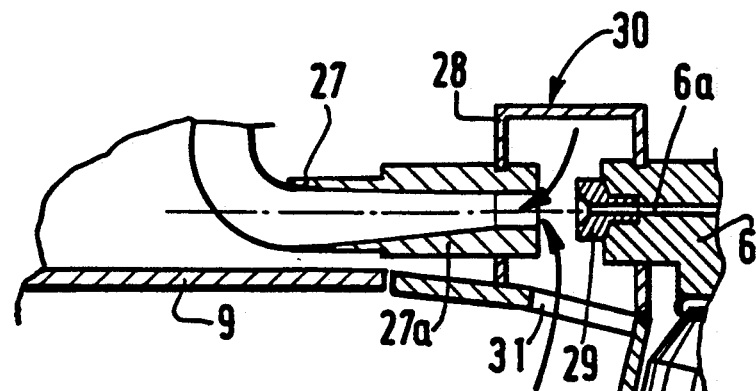
FIG. 4 shows an enlarged view, with a partial cutaway, of the means for mixing in primary air according to the invention which forms part of the device shown in FIG. 1.

To this end, as shown in FIG. 4, the block (6) comprises channels (6a) for the circulation of pressurized gas.

The ventilation means (2) are arranged at the rear of the conduit (9) by any appropriate means and comprises, in the traditional way, an electric motor (15) which drives a fan wheel (161) opposite the protective grid (11). The electric motor (15) is supplied with power by an appropriate source, in the form of the accumulator or electric battery (8), with a means for opening and closing the electrical power supply circuit described hereinbelow.

Figure 2:
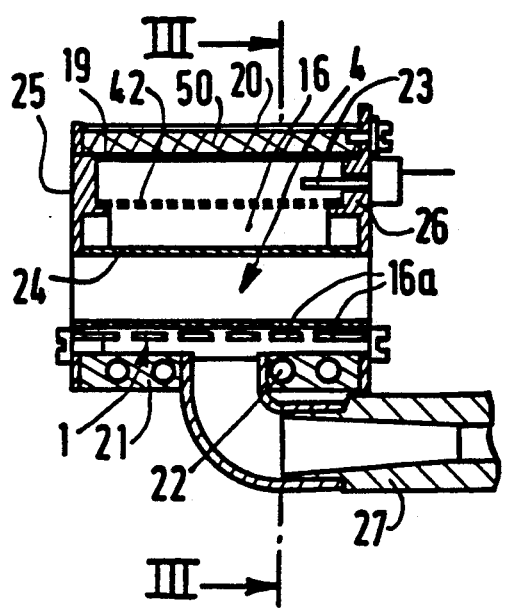
FIG. 2 shows a view in longitudinal section along the line II—II in FIG. 3, of the catalytic burner which forms part of the device according to FIG. 1.

With reference more particularly to FIGS. 1 and 2, the catalytic burner (4) is of the induced-air type and generally comprises:
- a chamber (16) for distributing the mixture of fuel gas and oxidant primary air, different inlets (16a) of which are each connected, as described hereinbelow, to the source of pressurized fuel gas, in other words to the aerosol valve of the cartridge (7);
- a catalytic structure (17), the inlet face (17a) of which faces the abovementioned distribution chamber, in this instance separated by an ignition chamber (18), and the outlet face of which (17b) faces the inside of the conduit (9), in other words with the air flow circulating in the latter.

To be more precise, the catalytic structure (17) comprises, on the one hand, a layer (50) of a refractory permeable support, for example a nonwoven of alumina fibers, which is impregnated with a combustion catalyst and, on the other hand, two wide-mesh metal lattices (19) and (20) which grip the layer (50). This structure (17), in the embodiment described above, is arranged and shaped essentially according to a tube, the axis of which is identical or parallel to the direction of the conduit (9). In fact, the catalytic structure (17) does not have an entirely tubular shape, since it has a lower opening, generally rectangular and narrow, which is defined by two generatrices of the tube in question. This opening is closed by a rectangular plate (21), which has a shape and size corresponding to the abovementioned opening, which ensures, as described hereinbelow, the distribution of the combustible mixture from below. This plate (21), which extends along the direction of the conduit, is integrated with the structure (17), by means of two shoulders of the latter which are pressed against two opposite edge pieces of the plate (21), along the two abovementioned generatrices by tie rods (22) which pass through the said plate and are each arranged perpendicular to the direction of the conduit (9). This plate (21), or distribution base plate, has a central and longitudinal channel (21a) which allows the combustible mixture to be dispersed and distributed and is connected, on the one hand to means (30) for mixing the primary air in with the fuel gas, described hereinbelow, and, on the other hand, to various slots which each form an inlet (16a) into the distribution chamber (16).

The catalytic burner (4) in addition has an internal partition (42) with an essentially tubular shape which is essentially arranged at a distance from the catalytic structure (17) and divides the interior of the latter into two chambers, namely, on the one hand, the ignition chamber (18) between the partition (42) and the catalytic structure (17) and, on the other hand, the distribution chamber (16) limited towards the outside of the burner by the partition (42). These chambers (16) and (18) are interconnected in view of appropriate orifices provided in the partition (42) or of the permeability of the latter. The tubular internal partition (42) has, similar to the structure (17), an opening (42a) corresponding with the opening (17c), defined by two generatrices and closed by the distribution plate (21). For this purpose, the internal partition (42) also has two outer shoulders, not shown, which are held tight by the tie rods (22) between the shoulders of the structure (17) and the two straight edge pieces of the plate (21). A spark plug (23), for example in the form of a resistor for igniting the combustible mixture, is arranged inside the ignition chamber (18).

An internal tube (24) is arranged inside and at a distance from the catalytic structure (17), the axis of this tube being identical or parallel to the direction of the conduit (9). This tube (24) is supported by two transverse plates (25) and (26), which are arranged on the downstream face and on the upstream face of the catalytic burner (4) respectively, according to the direction of circulation of the arrows (3), these plates extending transversely, in other words perpendicular to the direction of the conduit (9). The plates (25) and (26) each have an outer shoulder for supporting the partition (42), and an inner shoulder for supporting the tube (24). As shown in FIG. 2, each of these plates, fastened onto the distribution base plate (21), extends radially between the catalytic structure (17) and the internal tube (24). As shown in FIG. 1, the plate (26) also extends outside the catalytic structure (17) to form a flange for deflecting the air flow circulating in the conduit (9), upstream of the catalytic burner (4). Consequently, the projection of the outer contour of the burner (4), in other words of the structure (17), according to the direction of the channel (9), onto the flange (26) is inscribed entirely within the latter.

Figure 3:
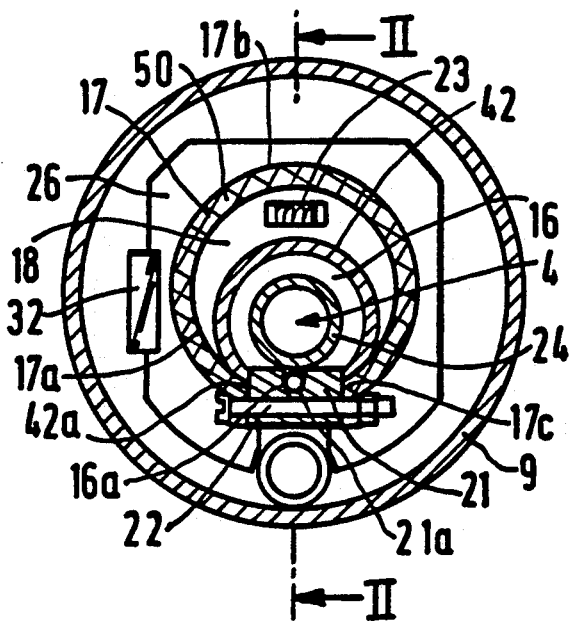
FIG. 3 shows a cross-sectional view, along the line III—III in FIG. 2, of the same catalytic burner.

From the above description, and by observing FIG. 3, it can be seen that the interior of the catalytic structure (17) is divided, from the outside inwards, into the ignition chamber (18), the distribution chamber (16) and the internal conduit (24). As a result of the latter, the air flow circulating in the conduit (9) passes not only outside the catalytic burner (17) but also inside the latter, from its upstream face towards its downstream face. This circulation of air inside the catalytic burner (4) allows the latter to be effectively cooled in view of the relatively high operating temperatures characteristic of all induced-air catalytic combustion.

With reference to FIGS. 2 and 4, the means for mixing primary air in with fuel gas, referenced in a general manner by an arrow (30), combined with the component (28) for drawing off or isolating primary air, are arranged upstream of the distribution chamber (16) and are connected, more particularly, to the distribution channel (21a) of the plate (21) by the connection channel (27). In accordance with the first embodiment of the invention, according to FIGS. 1 to 4, the mixing means (30) is situated entirely inside the conduit (9) and, consequently, the drawing-off component (28) consists of a cowl for isolation relative to the conduit (9), joining, in a relatively sealing manner, the upstream end of the connection conduit (27) and an end of the metal block (6) including an injector (29). The internal volume of the cowl (28), which ensures the introduction of primary air, communicates with outside of the conduit (9), by an extraction hole or opening (31) provided in the latter.

The mixing means (30) therefore comprise:

the injector (29) ejecting a gas jet of the pressurized fuel gas from the stream circulating and controlled in the block (6);

the upstream end (27a) of the connection tube (27), which has a diverging internal shape like a Venturi tube, arranged at a distance from and in the axis of ejection of the injector (29);

the cowl (28) which defines the space for introducing the primary air towards the inside of the connection channel (27), between its upstream end (27a) and the injector (29); this cowl (28) isolates the inside of the conduit (9) relative to the abovementioned space for introducing primary air, which space is connected to the outside of the conduit (9) by the opening (31) provided in the body (1); the cowl (28) therefore has two opposite perforations which allow a relatively sealing connection to the upstream end (27a) of the tube (27) on the one hand, and to the end of the body (6) including the injector (29) on the other hand.

As indicated above, this solution allows the primary air originating from outside the conduit (9) to be introduced in an unrelated and independent way relative to the air flow circulating in the latter.

Furthermore, a heat-sensitive element (32) is arranged on the flange (26) so as to exchange heat in relation to the catalytic burner (4). This element controls the electrical power supply circuit of the motor (15), this circuit being opened or closed when the heat-sensitive element reaches a predetermined temperature. In this way, the fan (13) starts to operate when the catalytic burner has reached the predetermined temperature, which allows the temperature of the latter to rise more quickly when the device is turned on. When the catalytic burner is halted, the fan allows it to cool down rapidly before the user has stopped using the device.

Figure 5:
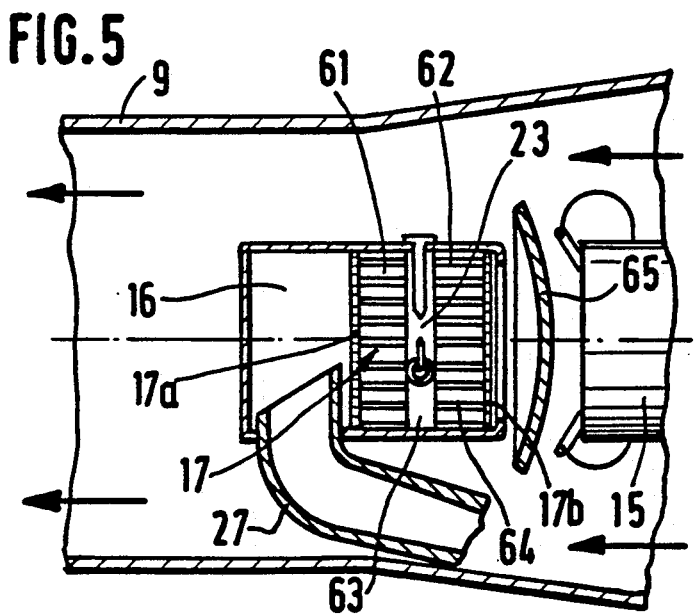
FIG. 5 shows a diagrammatic sectional view of another embodiment of the present invention.

According to FIG. 5, the catalytic structure (17) consists of two identical cores (61) and (62) which are refractory and permeable and separated from each other by an ignition gap (63). The electrical ignition means (23), which consists in this case of two opposite electrodes, is arranged in the ignition gap (63). Each refractory core (61) or (62) is run through from its inlet face to its outlet face, according to the direction of circulation of the mixture to be burnt, by a plurality of parallel channels (64) which each extend according to the direction of the circulation conduit (9) and the internal surface of which is coated with a combustion catalyst. These catalysts are well known in the prior art by the name "honeycomb" structure.

According to this embodiment, the mixture to be burnt (fuel gas plus primary air) circulates successively through the first core (61), and then the second core (62), the inlet face of the first forming the inlet face (17a) of the catalytic structure, and the outlet face of the second core forming the outlet face (17b) of the same structure.

In FIG. 5, the following features may in addition be noted:

the inlet face (17a) of the catalytic structure is arranged opposite the outlet (12) of the conduit (9) and the distribution chamber (16) is reciprocally arranged at the rear of the catalytic burner according to the direction of the gas flow in the channel (9);

a reflector (65) is arranged opposite the outlet face (17b) of the catalytic structure so as to heat-shield the motor (15).

Figure 6:
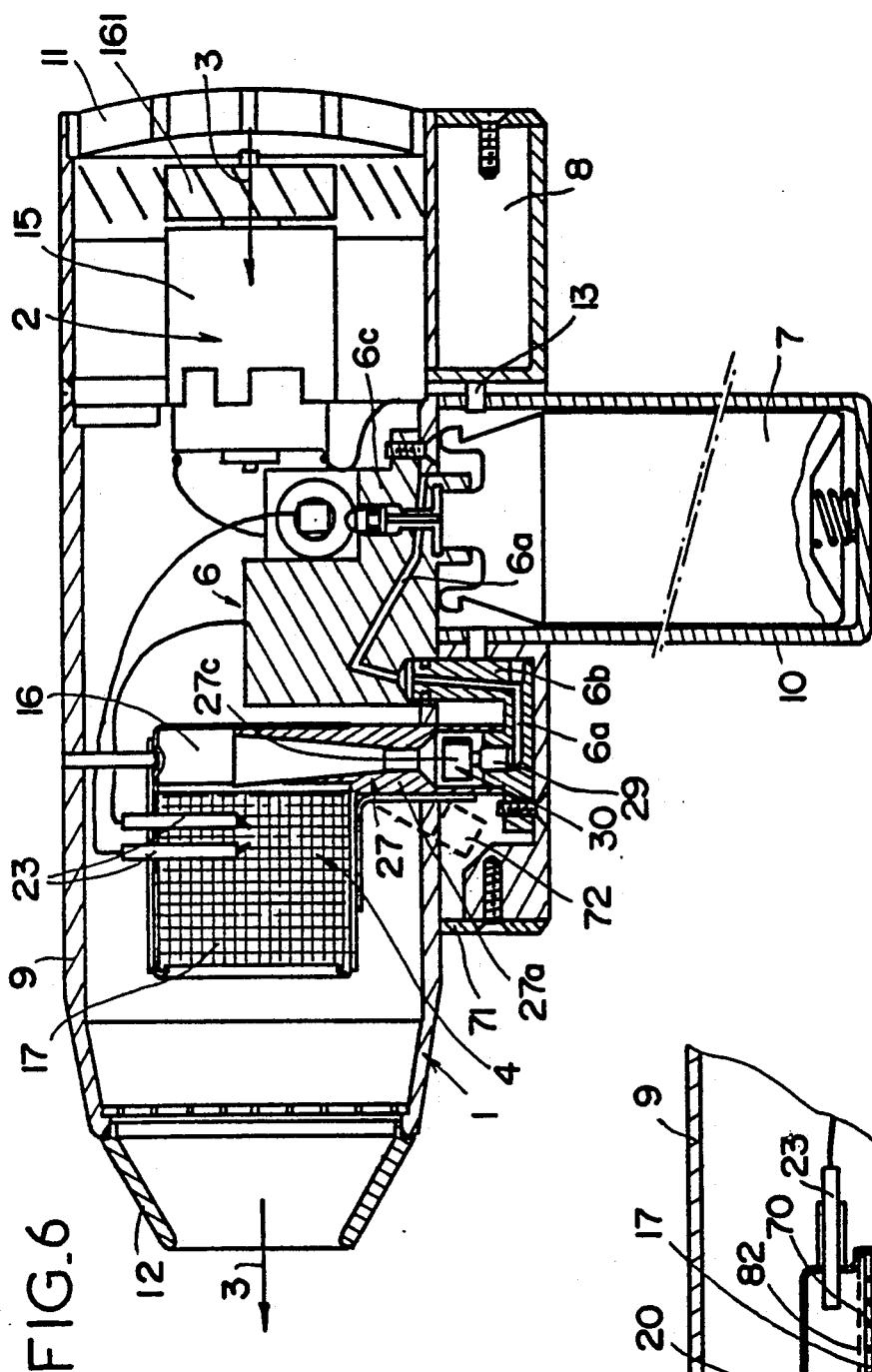
FIG. 6 shows a diagrammatic sectional view of another embodiment of the present invention.

The embodiment according to FIG. 6 differs from that described with reference to FIGS. 1 to 4 in the following points.

The catalytic structure (17) is of the type described with reference to FIG. 5 and has, consequently, two permeable refractory cores, not shown, which are separated by an ignition gap.

The connection channel (27) between the distribution chamber (16) and the injector (29) is arranged transversely relative to the conduit (9) and parallel to the cartridge (7). The mixing means (30), comprising the injector (29), as well as the upstream end (27a) of the tube (27) shaped like a Venturi tube, is situated at the end of the conduit (9). To this end, the metal block (6) is, on the one hand, divided into two parts, (6c) situated inside the conduit (9) and (6b) situated outside the conduit (9), comprising the injector (29) and, on the other hand, is protected by a plastic cowl (71) which allows ambient air to pass through.

A mechanism termed "starter" (72), which consists of a temperature-sensitive bimetal strip, can be displaced inside the plastic cowling (71) so as to seal the opening (27c) for entry of primary air provided on the end (27a) of the tube (27) when cold, and to free the same opening when hot. A mechanism of this type therefore allows the flow rate of primary air to be modulated according to the operating temperature and, in particular, to enrich the mixture to be burnt with fuel gas at the moment of ignition.

Figure 7:
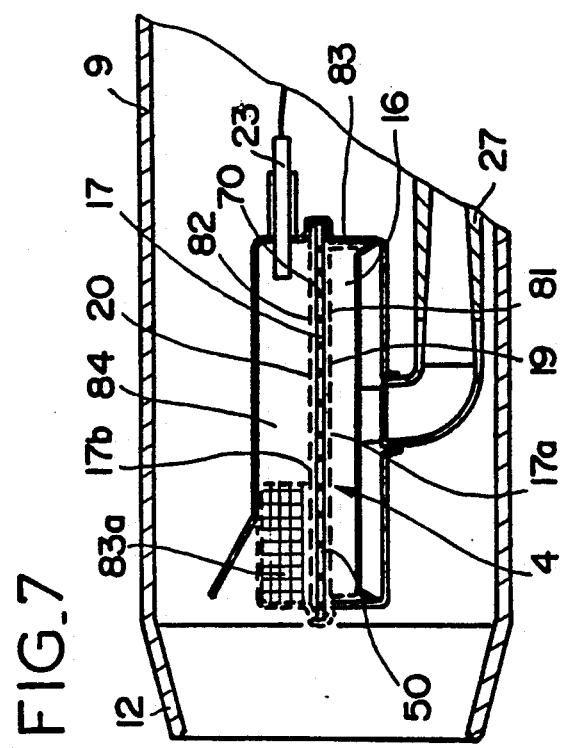
FIG. 7 shows a view in axial and vertical section of another catalytic burner which can be used according to the invention.

The catalytic burner (4) shown in FIG. 7 differs from that shown in FIGS. 2 and 3 in the following points.

The catalytic structure (17) comprises a layer (50) formed from a homogeneous tangle of ceramic fibers having the cohesion and flexibility of a piece of paper and having a plurality of perforations (70) distributed along the surface of the layer running through it from its inlet face (17a) to its outlet face (17b). A structure of this type has been described in French Patent Application No. 8,910,795 filed on 7th Aug. 1989, the contents of which have been incorporated in the present description as of need. The inlet and outlet faces (17a) and (17b) are protected by retaining refractory metal grids (81) and (82) respectively.

This catalytic structure is arranged flat and in a mid-plane of a rectangular housing (83) parallel to the direction of the conduit (9) and defines, at either end, the distribution chamber (16) and an ignition chamber (84). The housing (83) has an opening (83a), protected by a flameproof grid, which faces towards the outlet (12) of the conduit (9) and is in contact only with the downstream chamber (84) of the burner. The combustion gases escape via this opening (83a) and are mixed with the flow of ventilated air.

What is claimed is:

1. A hot air-generating device, comprising:

a body which forms a conduit for the circulation of an air flow, extending from an inlet for fresh air to an outlet for hot air a ventilation means arranged inside the body for generating the flow of air from the inlet towards the outlet of said conduit a catalytic gas burner, which is disposed inside the conduit, which is connected with a source of pressurized fuel gas, and combustion fumes of which are mixed with the air flow to produce the hot air discharged through the conduit outlet, said burner being of the induced air type and comprising a means for mixing primary air in the fuel gas, an inlet outside said conduit to draw said primary air independently and separately relative to the air flow circulating in said conduit, a chamber for distributing the fuel gas mixed with the air downstream of the mixing means, and a catalytic structure, the inlet face of which faces the distribution chamber, and the outlet face of which is in faces the conduit for the air flow.

2. The device as claimed in claim 1, wherein the means for mixing primary air and the fuel gas is situated inside the conduit, and comprises a cowl for isolating relative to said conduit, the internal volume of said cowl for introducing primary air is connected directly with outside of said conduit via said inlet.

3. The device as claimed in claim 1, wherein only the means for mixing primary air and the fuel gas is situated outside the conduit and it is arranged in a protective cowling permeable to ambient air.

4. The device as claimed in claim 1, wherein the catalytic structure comprises a layer of a refractory permeable support, which is impregnated with a combustion catalyst, and this structure is arranged and shaped essentially as a tube, the axis of which is parallel to an axis of the conduit for the circulation of the air flow, the distribution chamber being included inside said tube.

5. The device as claimed in claim 4, wherein a flange for deflecting the air flow is arranged in the conduit upstream of the catalytic burner, transverse relative to the direction of said conduit, the projection of the outer contour of said burner, according to said direction, onto said flange being entirely inscribed within the contour of said flange.

6. The device as claimed in claim 4 wherein the catalytic burner has an internal tube, which is arranged essentially at a distance from the catalytic structure and the axis of which is identical to or parallel to an axis of the conduit for the circulation of the air flow, the upstream and downstream faces of the burner being closed by a transverse plate which extends between the tubular catalytic structure and the internal tube.

7. The device as claimed in claim 1, wherein the catalytic structure has at least two refractory cores, which are separated from each other by an ignition gap, each core having a plurality of parallel channels passing through it from its inlet face to its outlet face and the internal surface of which is coated with a combustion catalyst.

8. The device as claimed in claim 7, wherein the catalytic structure is arranged such that the fuel gas mixed with the primary air circulates successively through one core and then the other, the inlet face of the first core forming the inlet face of the catalytic structure, and the outlet face of the second core forming the outlet face of the catalytic structure.

9. The device as claimed in claim 1, wherein the catalytic structure has a layer formed from a homogenous tangle of ceramic fibers, having the cohesion and flexibility of a piece of paper and having a plurality of perforations distributed along the surface of the layer running through it from the inlet face (17a) to the outlet face.

10. The device as claimed in claim 9, wherein the catalytic structure comprises a layer of a refractory permeable support, which is impregnated with a combustion catalyst, and this structure is arranged flat, parallel to an axis of the conduit for the circulation of the air flow (9).

* * * * *